DIFFERENTIAL SPEED ROTARY DRIVE ASSEMBLY

Filed Sept. 27, 1966

INVENTOR:
ALBERT P. WEINER,
BY W. J. Shanley Jr.
HIS ATTORNEY.

INVENTOR:
ALBERT P. WEINER,
BY W. J. Shanley, Jr.
HIS ATTORNEY.

United States Patent Office 3,426,604
Patented Feb. 11, 1969

3,426,604
DIFFERENTIAL SPEED ROTARY DRIVE ASSEMBLY

Albert P. Weiner, Limerick, Ireland, assignor to General Electric Company, a corporation of New York Filed Sept. 27, 1966, Ser. No. 582,300
U.S. Cl. 74—10.54 2 Claims
Int. Cl. F16h 35/18

ABSTRACT OF THE DISCLOSURE

A differential speed rotary drive assembly is shown utilizing an internal epicyclic gear train for fine adjustment control. The fine adjustment control shaft operates the internal circular gears of the train by means of an eccentrically mounted pair of spring fingers on the shaft which urge the internal gears into engagement with the two outer gears of the train. A friction clutch is provided between the driving and driven gears to allow for operation of the fine adjustment shaft in both directions of rotation.

This invention relates to a differential speed rotary drive assembly and more particularly to such assemblies for use as part of tuning or adjusting devices for electrical or electronic apparatus.

It has been customary to provide adjusting devices for electrical or electronic apparatus, such as channel selection or tuning devices for television receivers, which include manually adjustable means for both "coarse" and "fine" tuning. The coarse tuning means permits rapid adjustment of the receiver approximately to a desired channel. The fine tuning means permits slower but more exact adjustment of the receiver to precisely the desired channel. It has also been found desirable to position such adjusting devices at one location on the television receiver cabinet so as to add to the convenience of the operator.

The prior art devices, however, have required generally complex and intricate driving mechanisms which are usually difficult and expensive to manufacture and prone to breakdowns. While some more recent devices have somewhat simplified these driving mechanisms, they have not adequately provided for control of backlash, that is, the distance or clearance which one part of a connected machinery, such as a gear, can be moved without moving the connected parts, resulting from looseness in fitting or from wear, nor do they usually allow unlimited "fine" tuning in either direction at any point in the coarse tuning range. Since rapir, continuous and precise adjustment is very desirable in a tuner or channel selector utilized in a television receiver, it is expedient to effectively eliminate any undesirable backlash.

It is, therefore, an object of this invention to provide a reversely and continuously rotatable drive assembly including a simple driving and coupling arrangement so as to produce an inexpensive, compact and self-contained structure.

It is also an object of this invention to provide a reversely and continuously rotatable drive assembly including a simple driving and coupling arrangement wherein undesirable backlash is effectively eliminated.

It is a further object of this invention to provide a reversely and continuously rotatable drive assembly for driving a rotatable shaft at different rates of speed through utilization of a simple driving and coupling arrangement wherein undesirable backlash is effectively eliminated.

It is a still further object of this invention to provide a reversely and continuously rotatable drive assembly including means for eliminating undesirable backlash so as to effect rapid and precise coarse and fine adjustment of a channel selection device for a television receiver.

In carrying out the objects of my invention in one form thereof, I provide a driving and coupling arrangement for a differential speed rotary drive assembly including a coarse adjusting shaft and a fine adjusting shaft journalled thereon. The fine adjusting shaft includes an integral eccentric formed from a pair of curved spring fingers. A circular gear is journalled on the eccentric and is in engagement with a further element in the drive assembly. The curved spring fingers urge the circular gear outwardly so as to produce taut engagement between the circular gear and its mating gears. Tensioning means are provided which urges the other elements in the drive assembly into taut engagement, thereby effectively eliminating any undesirable backlash.

Other objects and advantages of my invention may better be understood by reference to the following description taken in connection with the accompanying drawings in which.

The drive assembly of this invention may be utilized with various types of electrical devices. In each instance, suitable manual controlling elements or knobs would be connected to the coarse and fine adjusting shaft, respectively, to effect control thereof. Additionally, the drive assembly would be connected to an external load to effect the desired change in the electrical device and to provide an indication to the operator through an indicator gear as to the extent of the change that has taken place. Since such details are not essential parts of this invention and may be of generally conventional variety, the electrical and mechanical details of such elements will not be described herein.

Figure 1:
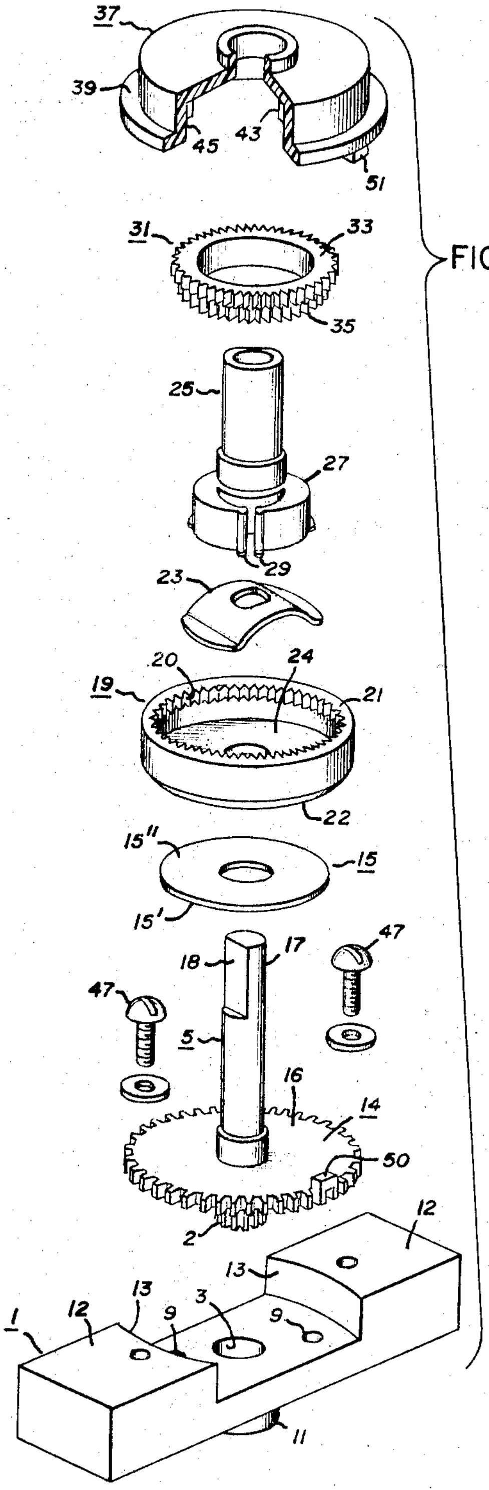
FIGURE 1 is an exploded view of the elements comprising the drive assembly.

FIGURE 1 shows an exploded view of the element comprising the drive assembly. The gear housing includes a base 1 which is provided with a conical bearing 3 for one end of the coarse adjusting shaft 5 and is also provided with mounting holes 9, alignment bushing 11, arcuate alignment surfaces 13 for locating the upper portion of the drive assembly, and bosses 12 for clamping the assembly together. An indicator gear 14 is integrally attached to the coarse adjusting shaft 5 near the geared end 2. A disc-like member 15 having a frictional surface 15' of suitable friction coefficient is provided to be placed in juxtaposition to a face 16 of the gear 14. The other end 17 of the shaft 5 includes a cut-away portion 18 for reception of a suitable control knob (not shown). Concentric with the coarse adjusting shaft 5 is a driving means constituted by a cup-shaped or internal gear 19 including a web 22 across the bottom thereof forming a recess 24 and having a gear surface 20 on an inside surface of the rim 21 thereof. The web 22 of the internal gear 19 is suitably shaped to provide a conjugate clutch surface for a frictional surface 15'' of the disc member 15. Also concentric with shaft 5 is a resilient bowed spring 23 and a cylindrical fine adjusting shaft 25.

The fine tuning shaft 25 includes an integral eccentric portion 27 formed from a pair of curved spring fingers 29 which define the outer rim thereof. A circular gear 31 is provided including a pair of co-axial gear surfaces 33 and 35, gear surface 33 being larger in diameter than gear surface 35. A gear housing cap 37 concentric with fine adjusting shaft 25, includes an annular ring surface 39. An annular internal gear surface 43 is disposed on an interior position of rim 45. Clamping screws 47 are provided to secure the gear housing cap 37 against the base 1 so as to produce a compact housing to contain the driving and coupling arrangement therein.

Figure 2:
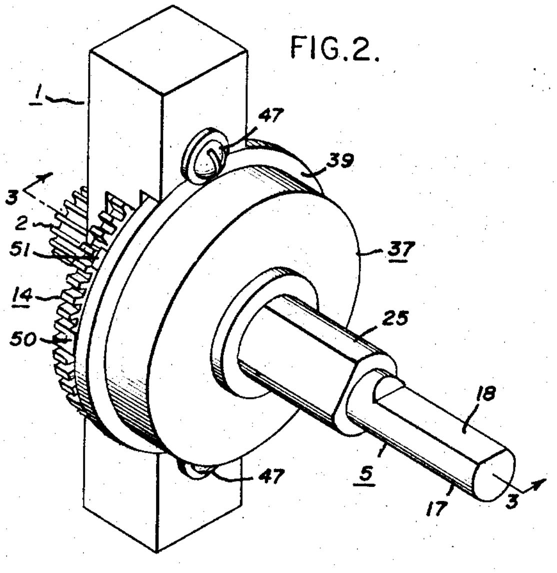
FIGURE 2 is a view of the elements of the drive assembled in accordance with the present invention.
Figure 3:
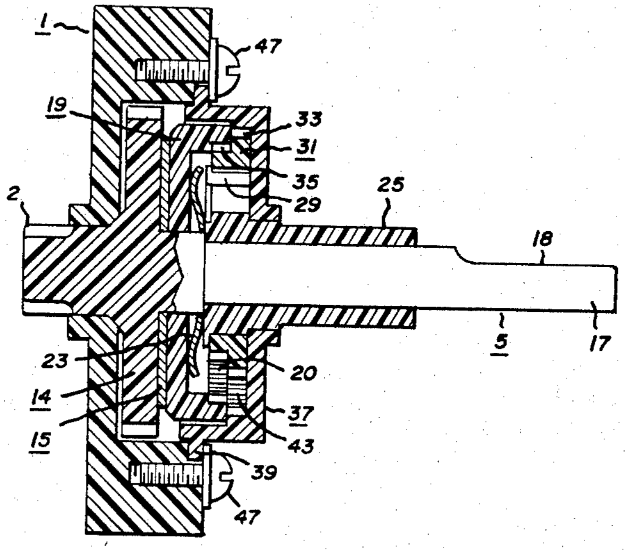
FIGURE 3 is a sectional view of the drive assembly taken on line 3—3 of FIGURE 2.

The particular mode of assembly and interrelationship of the elements of the drive assembly of the present invention can best be seen in FIGURES 2 and 3. FIGURE 2 shows a perspective view of the drive assembly ready for use. FIGURE 3 is a cross-sectional view taken along lines 3—3 in FIGURE 2 and best illustrates the functional interrelationships of the elements in the driving and coupling arrangement of the drive assembly. It can be seen that the entire driving and coupling arrangement is contained within the housing formed by the base 1 and the cap 37. The geared end 2 of the coarse adjusting shaft 5 projects through the back of base 1 to drive an external load, while the other end 17 projects through the housing cap 37 for manipulation.

Figure 4:
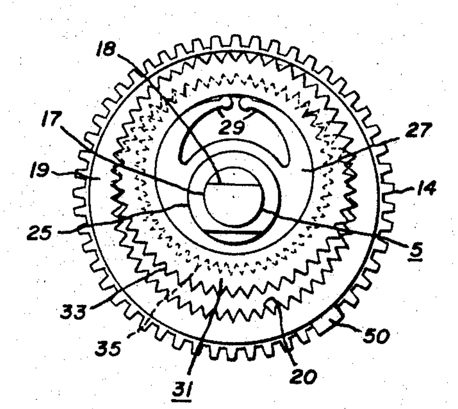
FIGURE 4 is an isometric view of the circular gear journalled about the eccentric of the present invention.

The frictional surface 15' is disposed in juxtaposition to fac 16 of the integral gear 14. The web 22 of the internal gear 19 is juxtaposed to the frictional surface 15''. The hollow or tubular fine adjusting shaft 25 is mounted for rotation about the coarse adjusting shaft 5. Journalled upon the rim of eccentric portion 27 is circular gear 31, as is shown in FIGURE 4. The shaft 25 is oriented so that the smaller gear surface 35 on circular gear 31 is positioned within the recess 24 of the internal gear 19. A portion of the teeth on gear surface 35 are in meshing engagement with the interior gear surface 20 of the internal gear 19. The interior gear surface 20 of the internal gear 19 has a greater number of teeth than the smaller gear surface 35 of the circular gear 31.

The larger gear surface 33 of the circular gear 31 is in meshing engagement with the interior gear surface 43 of the gear housing cap 37. Since the interior gear surface 43 of the gear housing cap 37 has a greater number of teeth than the larger gear surface 33 of the circular gear 31, rotation of the fine adjusting shaft 25 will cause gear 31 to planetate about gear surface 43. Since gear housing cap 37 is immobilized by clamping screws 47 which engage ring surface 39 and are received in holes 12 on the base 1, rotation of the fine adjusting shaft 25 will impart planetary motion to the circular gear 31 and will result in the aforementioned planetation of the circular gear surfaces 33 and 35 about the respective internal gear surfaces 43 and 20 of the gear housing cap 37 and the internal gear 19. If internal gear surface 20 were identical to internal gear surface 43 of cap 37 and circular gear surface 35 were identical to circular gear surface 33, the planetary motion of gear 31 would result in no motion of internal gear 19. Gear 35 might be visualized as walking or rolling around inside internal gear 19. However, in this case because gears 35 and 20 are proportionately smaller than gears 33 and 43, the planetary motion of gear 31 results in rotary motion of internal gear 19 and in the same direction as the fine tune shaft 25 is being rotated.

The dome-shaped spring 23 is mounted on and free to move easily about the coarse adjusting shaft 5. The spring 23 is disposed between the eccentric portion 27 of the fine adjusting shaft 25 and the web 22 of internal gear 19. The previously described tightening of clamping screws 47 so as to fixedly position the gear housing cap 37 results in a flexing of the spring so that it exerts a force in two lateral directions. Firstly, it exerts a force against the eccentric portion of fine tune shaft 25 thereby causing it to seat firmly in its bearing in cap 37. Since a major contributor to backlash is looseness in the shaft bearings this force tends to minimize this looseness and also creates a friction in the bearing 3 which gives a desirable smoothness of feel to the operator. Secondly, the tension spring also exerts a force against the web 22 of the internal gear 19 so as to maintain the gear in driving frictional engagement with friction disc 15 and integral gear 14 on the coarse adjusting shaft 5 so that the desired amount of rotation can be imparted to the integral planetary gear 14 and the coarse adjusting shaft 5.

As was noted earlier, the circular gear 31 is mounted on eccentric 27 which is defined by spring fingers which urge gear 31 into maximum eccentricity thereby causing gear surfaces 33 and 35 into intimate contact with mating internal gear surfaces 20 and 43 respectively. This intimate contact greatly reduces backlash caused by tooth to tooth clearance in mating gears. Since all the moving parts are spring loaded either by the spring 23 or spring fingers 29 and the motion of all moving parts is always in the same direction, the friction caused by spring loading will tend to make the output 2 follow the motion of fine tune shaft 25. This combination of friction and direction of rotation tends to cover or mask any remaining backlash in the drive system with fractionally created motion in the proper direction, giving the operator essentially backlash-free fine tuning.

From the foregoing description of the drive assembly of the present invention, it can be seen that manual rotation of the coarse adjusting shaft 5 through a suitable knob connected at end 17 results in smiliar rotation of the geared end 2 so that the external load is driven at a ratio of one-to-one. Manual rotation of the fine adjusting shaft 25 through a suitable knob connected thereto causes related rotary motion of the eccentric portion 27, thereby resulting in planetary motion of the journalled circular gear 31. The larger gear surface 33 of the circular gear 31 planetates about the internal gear surface 43 of the fixed gear housing cap 37. The smaller gear surface 35 of the circular gear 31 planetates about the internal gear surface 20 of the internal gear 19, thereby imparting rotary motion thereto. Since the web 22 of the internal gear 19 is in driving frictional engagement with friction disc 15 and integral gear 14, the integral gear and the course adjusting shaft 5 will be caused to rotate, but at a rate slower than the rate at which the fine adjusting shaft is rotating. Thus, a more exact adjustment of the electrical or electronic device can be obtained to precisely the desired position.

During operation of the coarse adjusting shaft, the clutch 15, 22 slips since this type of gear reducer cannot be back-driven. Projection 50 is disposed on the periphery of integral gear 14 so that rotation of the coarse adjusting shaft 5 is limited by projection 51 on cover 37 which serve as a stop. If the fine adjusting shaft 25 is inadvertently turned when the coarse adjusting shaft 5 is in one of the stop positions, the clutch 15, 22 will slip, protecting the drive elements from any overload.

Of course, before initiating operation of the drive assembly, the base 1 will be suitably mounted at the desired position on the electrical or electronic device and the drive would be assembled as described above. With the clamping screws 47 partially tightened, the coarse adjusting shaft 5 would be rotated to the desired stop position and the cover 37 would be rotated in the appropriate direction until stop 51 was against projection 50. The clamping screw 47 would then be finally tightened so that the drive assembly could operate through the full range of desired adjustments.

As desired, indicator gear 14 can be appropriately coupled to provide tuning indication. I have thus described a reversely rotatable drive assembly for driving a rotatable shaft at different rates of speed through utilization of a simple driving and coupling arrangement wherein undesirable backlash is effectively eliminated so as to effect rapid and precise coarse and fine adjustment of an electrical or electronic device, such as a channel selector for a television receiver.

What I claim as new and desire to secure by Letters Patent of the United States is:

1. In a reversely rotatable drive assembly provided with a directly rotatable coarse adjusting shaft including an integral driven gear thereon, a fine adjusting mechanism comprising:

(a) driving means comprising a cup-shaped gear having teeth within the inside rim thereof, journalled on said coarse adjusting shaft and in frictional engagement with said driven gear;

(b) a fine adjusting shaft journalled on said coarse adjusting shaft and including an eccentric portion integrally mounted for rotation therewith, said eccentric portion including a pair of curved spring fingers which define the outer rim thereof;

(c) a circular gear journalled on said eccentric portion, including a first gear surface having less teeth than the number of said teeth on the cup-shaped gear and including a second gear surface of greater diameter than the first gear surface, the first gear surface being received in said cup-shaped gear with part of the teeth of said first gear surface engaging teeth on said inside rim;

(d) a fixedly mounted cup-shaped cover journalled on said fine adjusting shaft having a gear surface on the inside rim thereof, the teeth of which are greater in number than, and engage a portion of, the teeth on said second gear surface of the circular gear such that rotation of the fine adjusting shaft causes said second gear surface to planetate about the gear surface of the cover and causes said first gear surface to planetate about the gear surface of the cup-shaped gear; and (e) tensioning means maintaining said driving means in driving frictional engagement with said driven gear, and said spring fingers urging said circular gear in driving engagement with said driving means whereby said driving means, upon rotation of said fine adjusting shaft, drives said driven gear and said course adjusting shaft at a rate slower than the rate at which said fine adjusting shaft is rotated.

2. The reversely rotatable drive assembly in claim 1 wherein said tensioning means includes a spring disposed within the cover between said cup-shaped gear and said eccentric.

References Cited

UNITED STATES PATENTS

| | | | |
|---|---|---|---|
| 1,665,848 | 4/1928 | Gammeter et al. | 74—10.52 |
| 2,167,677 | 8/1939 | Petersen | 74—10.52 |

MILTON KAUFMAN, *Primary Examiner.*